Sept. 22, 1942.  J. A. MULLER ET AL  2,296,730
INJECTION MOLDING MACHINE WITH INCLINED CLAMPS
Filed June 21, 1938
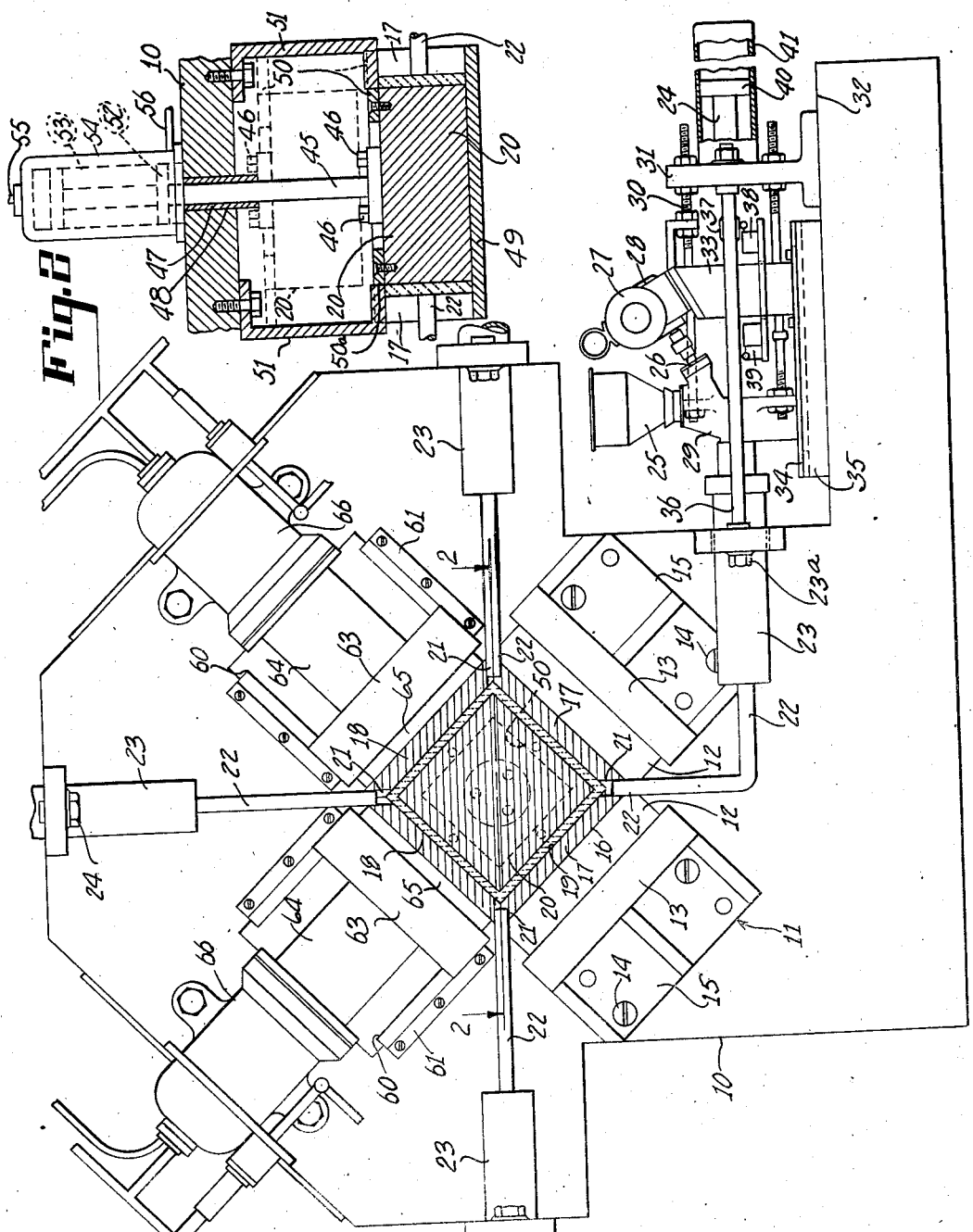
INVENTOR
JOHAN A. MULLER
WARREN R. TUCKER
BY
ATTORNEYS Patented Sept. 22, 1942

2,296,730

UNITED STATES PATENT OFFICE 2,296,730

INJECTION MOLDING MACHINE WITH INCLINED CLAMPS

Johan A. Muller and Warren R. Tucker, Mount Gilead, Ohio, assignors to The Hydraulic Development Corporation, Inc., Wilmington, Del., a corporation of Delaware Application June 21, 1938, Serial No. 214,958

4 Claims. (Cl. 18—30)

This invention relates to molding machines and, in particular, to presses or the like for molding articles by means of injection of the molding material into the molds.

One object of this invention is to provide an injection molding machine having means for closing the mold from two directions which are inclined to the vertical.

Another object is to provide an injection molding machine having a plurality of obliquely moving plungers for closing or clamping the mold or molds and injection means for injecting molding material into the mold or molds.

Another object is to provide an injection molding machine wherein the molds are clamped by hydraulic plungers operating in directions inclined relatively to the vertical direction, whereby any inserts or the like may be retained in position at least partially by gravity.

In the drawing:

Figure 1 is a side elevation, partly in section, of an injection molding machine with inclined clamping plungers according to the present invention; and Figure 2 is a horizontal section along the line 2—2 in Figure 1.

Referring to the drawing in detail, Figure 1 shows an injection molding machine with a plate-like frame 10 having bed brackets 11 mounted obliquely thereon. Supported by the bed brackets 11 are the bed plates 12 arranged obliquely to the vertical and resting upon the bracket portions 13. The latter are secured to the frame 10 by means of screws 14 passing through the bracket portions 15 thereof.

Secured to and supported by the bed plates 12 is a mold, generally designated 16. The mold 16 consists of a lower portion 17 and upper closure portions 18 containing a mold cavity 19 and a core 20. Communicating with the mold cavity 19 are passageways 21, to which are joined the conduits 22 leading to injection cylinders 23. The latter are secured, as at 23a, to the machine frame 10. The injector cylinders 23 contain injector plungers 24, to which molding material is fed from the hoppers 25 by means of the rotatable feeding shaft 26 operated by the motor 27 and reduction gear box 28.

Figure 1 shows only one of the feeding and injecting units, the others being omitted for conciseness of showing. The hopper 25 communicates with a feed casing 29 containing the feed shaft 26 and having a passageway opening into the injection cylinder 23. The position of the injection mechanism may be adjusted by the threaded rods 30 passing through the bracket 31 mounted upon the shelf of the frame 10, the casing 29 and the pedestal 33, upon which the motor 27 is supported, being mounted upon the slide 34 which, in turn, is slidably supported by the base 35 mounted upon the shelf 32.

The bracket 31 is connected to the frame 10 by means of the tie rods 36, behind which is concealed the injection plunger 24. Mounted upon the latter is a tapered collar 37 arranged for operating limit switches 38 and 39 at the opposite ends of its stroke so as to control an electrical circuit governing the feeding cycle. This electrical circuit and the structure and operation of the feeding mechanism, shown in the lower righthand corner of Figure 1, form no part of the present invention, and are disclosed and claimed in the copending application Serial No. 176,504, filed November 26, 1937. The injection plunger terminates in a piston head 40 reciprocable within the cylinder 41 by pressure fluid supplied thereto.

Laterally, the mold core 20 is moved into and out of the mold 16 by the plunger 45 secured thereto, as at 46, and passing through the sleeve 47 within the bore 48 of the plate-like frame 10 (Fig. 2). The mold cavity 19 is closed at front and rear by the front and rear closure plates 49 and 50, the latter being secured to the mold core 20. The rear closure plate 50 is slotted as at 50a to receive the outer ends of the stripper arms 51, the inner ends of which are secured to the frame 10. The plunger 45 terminates in a piston head 52 which is reciprocable within the port 53 of a cylinder 54, fluid to the opposite end of which is supplied through the conduits 55 and 56.

The frame 10 is provided with inclined guide plates 60 having side portions 61 secured thereto for guiding the platens 63. The latter are mounted on plungers 64 and have secured thereto the plates 65 carrying the upper mold portions 18. The plungers 64 reciprocate in hydraulic cylinders 66, the axes of which are inclined to the vertical.

Operation

In the operation of the molding machine of this invention, the lower portions 17 of the mold are secured to the bed plates 12. The upper mold portions 18 mounted upon the plates 65 attached to the platen 63 are then brought into mold closing position by supplying pressure fluid to the cylinder 66, causing the plunger 64 to move inwardly and downwardly in inclined directions.

The mold may then be completely closed by admitting pressure fluid to the cylinder 54 (Fig. 2), forcing the piston 52 and plunger 45 inwardly to close the mold laterally, as shown in the solid lines in Figure 2, the dotted lines representing the open position.

The feeding and injection apparatus shown in the lower righthand corner of Figure 1 may then be operated to inject plastic molding material from the injection cylinders 23 through the conduits 22 and ports 21 into the mold cavity 19, thereby filling the mold cavity. As injection takes place from a plurality of different directions, the mold cavity is filled rapidly without the possibility of the material chilling or clogging the mold. In this manner, molded articles of large dimensions can be efficiently made without the chilling of the material, which previously prevented the molding of such large articles.

After the injection and cooling have been completed, pressure fluid may be supplied to the cylinder 66 to operate the plunger 64 in the reverse direction, moving the platens 63 upwardly and outwardly in oblique directions. At the same time, pressure fluid may likewise be supplied to the cylinder 54 to force the piston head 52 and plunger 45 outwardly to open the mold laterally, the parts moving into the dotted line position shown in Figure 2. The article may then be removed from the mold.

If insertions such as metallic parts are to be placed in the molded article, these may be held in position, at least partly, by the force of gravity due to the generally vertical arrangement of the press. At the same time, however, the mold portions may be opened obliquely by the inclined plungers 64, thereby creating an access to the mold which has not hitherto been available.

It will be understood that we desire to comprehend within our invention such modifications as come within the scope of the claims and the invention.

Having thus fully described our invention, what we claim as new and desire to secure by Letters Patent is:

1. In a press, a frame having a pair of inclined guideways disposed in an approximately V-shaped arrangement, platens reciprocable in said guideways, hydraulic plungers secured to said platens, inclined hydraulic cylinders reciprocably receiving said plungers, a mold supported in part on said frame having a plurality of separable portions, one of said portions being secured to each of said platens, and material injecting means disposed between said platens.

2. In a press, a frame having a pair of inclined guideways disposed in an approximately V-shaped arrangement, platens reciprocable in said guideways, hydraulic plungers secured to said platens, inclined hydraulic cylinders reciprocably receiving said plungers, a mold supported in part on said frame having a plurality of separable portions, one of said portions being secured to each of said platens, and material injecting means disposed between said platens and operable in a direction inclined relatively to the directions of reciprocation of said inclined plungers.

3. In a press, a frame having a pair of inclined guideways disposed in an approximately V-shaped arrangement, platens reciprocable in said guideways, hydraulic plungers secured to said platens, inclined hydraulic cylinders reciprocably receiving said plungers, a mold supported in part on said frame having a plurality of separable portions, one of said portions being secured to each of said platens, and material injecting means opening into the mold adjacent the parting line thereof.

4. In a press, a frame having a pair of inclined guideways disposed in an approximately V-shaped arrangement, platens reciprocable in said guideways, hydraulic plungers secured to said platens, inclined hydraulic cylinders reciprocably receiving said plungers, a mold supported in part on said frame having a plurality of separable upper portions arranged in inverted V-shape, one of said portions being secured to each of said platens, and two lower fixed portions forming with said movable portions the four sides of a hollow square, passageways at the four corners of said square, separate material injecting means communicating with each of said passageways, a hydraulic cylinder disposed laterally of said frame, and a laterally disposed hydraulic plunger movable therein, another of said mold portions being secured to said laterally disposed hydraulic plunger.

JOHAN A. MULLER.
WARREN R. TUCKER.